(12) United States Patent
Gokan et al.

(10) Patent No.: US 10,576,972 B2
(45) Date of Patent: Mar. 3, 2020

(54) VEHICLE DRIVING ASSIST CONTROL METHOD AND CONTROL DEVICE

(71) Applicant: Nissan Motor Co., Ltd., Yokohama-shi, Kanagawa (JP)

(72) Inventors: Toshimichi Gokan, Kanagawa (JP); Takuya Inoue, Kanagawa (JP); Tatsuya Suzuki, Kanagawa (JP); Kazuo Tamaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/071,505

(22) PCT Filed: Nov. 28, 2016

(86) PCT No.: PCT/JP2016/085130
§ 371 (c)(1),
(2) Date: Jul. 20, 2018

(87) PCT Pub. No.: WO2017/126226
PCT Pub. Date: Jul. 27, 2017

(65) Prior Publication Data
US 2019/0071074 A1 Mar. 7, 2019

(30) Foreign Application Priority Data
Jan. 22, 2016 (JP) .................. 2016-011032

(51) Int. Cl.
*G06F 17/10* (2006.01)
*G06G 7/78* (2006.01)
(Continued)

(52) U.S. Cl.
CPC ............... *B60W 30/09* (2013.01); *B60T 7/22* (2013.01); *B60W 50/14* (2013.01); *G01S 7/41* (2013.01);
(Continued)

(58) Field of Classification Search
CPC ......... B60W 30/09; B60W 50/14; G01S 7/41; G01S 13/723; G01S 13/867; G01S 13/931; G08G 1/16; G08G 1/166; B60T 7/22
(Continued)

(56) References Cited

U.S. PATENT DOCUMENTS

2012/0035846 A1* 2/2012 Sakamoto ........... B60T 8/17558
701/301
2015/0217765 A1 8/2015 Tokoro

FOREIGN PATENT DOCUMENTS

CN 103359113 A 10/2013
DE 10 2011 112 985 A1 3/2013
(Continued)

OTHER PUBLICATIONS

English Translation for JP2008234029A.*

*Primary Examiner* — Mahmoud S Ismail
(74) *Attorney, Agent, or Firm* — Global IP Counselors, LLP

(57) ABSTRACT

A host vehicle has an automatic brake control that is executed for avoiding contact between the host vehicle and a pedestrian upon detecting a pedestrian is present in a forward position of the host vehicle using a front camera and a radar. In a driving assist control method, upon detecting an object in front of the host vehicle to be a pedestrian candidate based on an image signal from the front camera, execution of an automatic brake control is permitted with the detected pedestrian candidate as the control target. Thereafter, whether or not the pedestrian candidate detected by the front camera matches an object detected by the reflected waves from the millimeter wave radar is determined by comparison. Execution of the automatic brake control is continued or stopped based on the result of the comparison determination.

5 Claims, 6 Drawing Sheets

(51) Int. Cl.
  *G08G 1/16* (2006.01)
  *B60W 30/09* (2012.01)
  *G01S 13/72* (2006.01)
  *B60T 7/22* (2006.01)
  *G01S 13/86* (2006.01)
  *B60W 50/14* (2020.01)
  *G01S 13/931* (2020.01)
  *G01S 7/41* (2006.01)
  *G05D 1/02* (2020.01)
  *G06K 9/00* (2006.01)
  *G01S 13/93* (2020.01)

(52) U.S. Cl.
  CPC .......... *G01S 13/723* (2013.01); *G01S 13/867* (2013.01); *G01S 13/931* (2013.01); *G05D 1/0246* (2013.01); *G05D 1/0257* (2013.01); *G06K 9/00369* (2013.01); *G06K 9/00805* (2013.01); *G08G 1/16* (2013.01); *G08G 1/166* (2013.01); *B60W 2050/143* (2013.01); *B60W 2420/42* (2013.01); *B60W 2420/52* (2013.01); *B60W 2550/10* (2013.01); *G01S 2013/9375* (2013.01); *G05D 2201/0213* (2013.01)

(58) Field of Classification Search
  USPC ........................................................ 701/301
  See application file for complete search history.

(56) References Cited

FOREIGN PATENT DOCUMENTS

| | | | | |
|---|---|---|---|---|
| JP | 2008-234029 A | 10/2008 | | |
| JP | 2008234029 A | * 10/2008 | ........... | G01S 13/867 |
| JP | 2009-294842 A | 12/2009 | | |
| JP | 2013-203336 A | 10/2013 | | |
| JP | 2013-228915 A | 11/2013 | | |
| JP | 2014-35560 A | 2/2014 | | |
| JP | 2015-145154 A | 8/2015 | | |
| KR | 10-2016-0003154 A | 1/2016 | | |
| WO | 2014/192143 A1 | 12/2014 | | |

* cited by examiner

VEHICLE DRIVING ASSIST CONTROL METHOD AND CONTROL DEVICE

CROSS-REFERENCE TO RELATED APPLICATIONS

This application is a U.S. national stage application of International Application No. PCT/JP2016/085130, filed on Nov. 28, 2016, which claims priority to Japanese Patent Application No. 2016-011032, filed on Jan. 22, 2016. The entire contents disclosed in Japanese Patent Application No. 2016-011032 is hereby incorporated herein by reference.

BACKGROUND

Field of the Invention

The present invention relates to a driving assist control method and control device for a vehicle that is equipped with a camera and a radar as external environment recognition sensors, and that executes driving assist control when it is determined that there is a possibility of contact between a host vehicle and a detected pedestrian during travel.

Background Information

Conventionally, an object detection device is known, which has the purpose of preventing erroneous detection of pedestrians, and which comprises a camera and a radar, in which the direction of an object candidate is calculated based on image information that is captured by the camera, and the direction of an object candidate detected by the radar is compared therewith. It is then determined whether or not the object candidate is a pedestrian according to the comparison result (for example, refer to Japanese Laid-Open Patent Application No. 2008-234029—Patent Document 1).

SUMMARY

However, in the conventional device described above, the distances and directions of two object candidates obtained by a camera and a radar are compared, and if the distances and directions of the two object candidates are determined to match, the object candidate is determined to be a pedestrian. Consequently, if this conventional device is employed in a driving assist control system, execution of the driving assist control is not permitted until a pedestrian determination is completed according to a comparison determination that the distances and directions of the two object candidates match. Therefore, there is the problem that driving assist control cannot be executed until a pedestrian determination is completed, thereby delaying the starting of the driving assist control.

In light of the problems described above, an object of the present invention is to provide a driving assist control method and control device for a vehicle that can realize an earlier start time for starting the driving assist control, while ensuring a function for preventing the erroneous determination of a pedestrian during travel.

In order to realize the object described above, the present invention comprises external environment recognition sensors that acquire forward information of the host vehicle. A camera and a radar are provided as external environment recognition sensors. When a pedestrian is detected by an external environment recognition sensor, driving assist control for avoiding contact between the host vehicle and the pedestrian is executed. Upon detecting an object that is present in front of the host vehicle to be a pedestrian candidate based on an image signal from the camera, execution of driving assist control is permitted, with the detected pedestrian candidate as the control target. Thereafter, it is determined using comparison whether or not the pedestrian candidate detected by the camera matches an object detected by the reflected waves from the radar, and the driving assist control is continued if matching is established and the driving assist control is canceled if matching is not established.

Therefore, in the case of using a camera and a radar to determine a pedestrian that is present in front of the host vehicle, when a pedestrian candidate is detected based on camera information that is capable of independently detecting a pedestrian using shape recognition, the execution of driving assist control is permitted without waiting for the comparison determination result. Then, when a pedestrian is present in front of the host vehicle, an object that is detected by a radar, which has higher object recognition capability than a camera, is used for the comparison determination, and after execution of driving assist control is permitted, it is determined using comparison whether or not the pedestrian candidate detected by the camera matches the object. It is determined whether or not to continue execution of the driving assist control based on this comparison determination result. As a result, it is possible to achieve an earlier start time for driving assist control, while ensuring the function for avoiding erroneous determination of a pedestrian during travel.

DETAILED DESCRIPTION OF THE EMBODIMENTS

Figure 1:
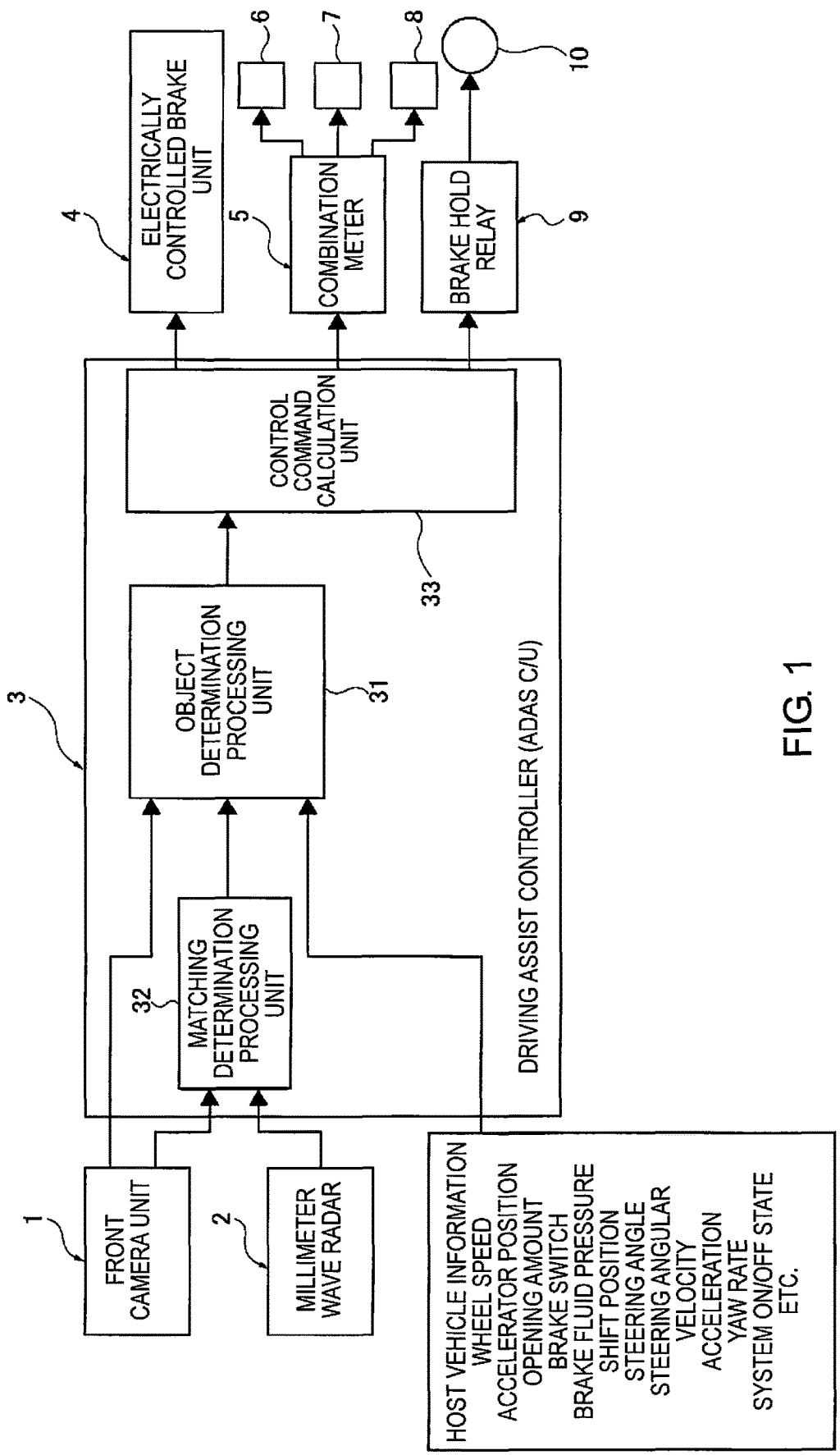
FIG. 1 is a view of a driving assist system illustrating the overall configuration of a driving assist system of an electrically driven vehicle, to which are applied the driving assist control method and control device according to a first embodiment.

A preferred embodiment for realizing the driving assist control method and control device for a vehicle of the present invention is described below based on a first embodiment illustrated in the drawings.

First Embodiment

The configuration is described first. The driving assist control method and control device according to the first embodiment are applied to an electrically driven vehicle (hybrid vehicle, electric vehicle, fuel cell vehicle, etc.) equipped with a system that executes automatic brake control, referred to as an emergency brake control system. The "overall configuration of the driving assist system" and the "configuration of the automatic brake control process" will be described separately regarding the configuration of the driving assist control device of the first embodiment.

Overall Configuration of the Driving Assist System

FIG. 1 illustrates the overall configuration of a driving assist system, to which are applied the driving assist control method and control device according to the first embodiment. The overall configuration of the driving assist system will be described below with reference to FIG. 1.

The driving assist system comprises a front camera unit 1, a millimeter wave radar 2, a driving assist controller 3, and an electrically controlled brake unit 4 as the main components, as illustrated in FIG. 1. The driving assist system also comprises a combination meter 5, an alarm buzzer 6, a brake warning lamp 7, a brake warning display 8, a brake hold relay 9 and a stop lamp 10 as peripheral components.

The front camera unit 1 is capable of capturing an image of the conditions in front of the host vehicle using an imaging element such as a CCD or CMOS imaging element, and is, for example, is attached to the central upper position of the windshield glass and detects image information from the area in front of the host vehicle, which is the imaging area. The detected image information is transmitted to the driving assist controller 3 using CAN communication. "CAN" is an acronym for "Controller Area Network."

The millimeter wave radar 2 is a radar system that is capable of detecting conditions in front of the host vehicle using radio waves in the millimeter wave band, and, for example, is attached to the front bumper and detects reflected waves from objects (preceding vehicles, pedestrians, etc.) that are present in front of the host vehicle by irradiation of millimeter waves. The presence/absence information of an object and the direction/position information of the object according to the detected reflected waves are transmitted to the driving assist controller 3 using CAN communication.

The driving assist controller 3 transfers signals that are necessary for control, and, for example, is attached to the innermost position of a glove box and carries out driving assist control such as automatic brake control. This driving assist controller 3 receives information from the front camera unit 1 and the millimeter wave radar 2 based on CAN communication signals. In addition, the driving assist controller receives host vehicle information, such as wheel speed, accelerator position opening amount, brake switch, brake fluid pressure, shift position, steering angle, steering angular velocity, acceleration, yaw rate, and system ON/OFF state, based on CAN communication signals from various controllers, which are not shown. The driving assist controller 3 transmits a brake fluid pressure command signal to the electrically controlled brake unit 4 via a CAN communication line, when the preliminary braking or the main braking is operated after the automatic brake control is started. Then, when the automatic brake control is started, the driving assist controller transmits a buzzer output signal and a meter display signal to the combination meter 5 via the CAN communication line. Furthermore, the driving assist controller transmits a stop lamp drive signal to the brake hold relay 9, when the preliminary braking or the main braking is operated after the automatic brake control is started.

The driving assist controller 3 here is referred to as an "ADAS control unit (ADAS C/U)" and has the function of an integrated controller that assists a plurality of driving operations including an automatic brake control function (FEB function). "FEB" is an acronym for "Forward Emergency Braking." Examples of driving assist control functions other than the automatic brake control function (FEB function) include an automatic cruise control function (ACC function), a lane keeping control function (LKS function), and a vehicle behavior control function (VDC function). "ADAS" is an acronym for "Advanced Driver Assistance System."

The electrically controlled brake unit 4 contains an integrated control unit, a master cylinder, and an electric booster (corresponding to cooperative regenerative braking in an electrically driven vehicle), and controls the fluid pressure to be fed to an ABS/VDC actuator. When the control unit of this electrically controlled brake unit 4 receives a brake fluid pressure command signal from the driving assist controller 3 via a CAN communication line, the control unit drives the motor of the electric booster and moves a piston so as to generate master cylinder fluid pressure. When a braking operation by a driver is detected, a driver brake detection signal is transmitted from the electrically controlled brake unit 4 to the driving assist controller 3 via the CAN communication line.

When a buzzer output signal from the driving assist controller 3 is received via the CAN communication line, the combination meter 5 sounds an alarm buzzer 6. In addition, when a meter display signal from the driving assist controller 3 is received via the CAN communication line, the combination meter flashes or illuminates the brake warning lamp 7 as well as illuminating the brake warning display 8.

When a stop lamp drive signal from the driving assist controller 3 is received via the CAN communication line, the brake hold relay 9 illuminates the stop lamp 10, bypassing the stop lamp circuit.

The driving assist controller 3 comprises an object determination processing unit 31, a matching determination processing unit 32, and a control command calculation unit 33, as illustrated in FIG. 1.

The object determination processing unit 31 acquires host vehicle information and camera information, that determines an object that is present in front of the vehicle including preceding vehicles and pedestrians, based on image information from the front camera unit 1, and further detects pedestrian candidates from the objects. Then, when it is detected that a pedestrian candidate has been present in the predicted path of the host vehicle for a set period of time, execution of an automatic brake control is permitted, with the detected pedestrian candidate as the control target. After the execution of the automatic brake control is permitted, the distance between the host vehicle and the pedestrian candidate is divided by the relative speed (=host vehicle speed) to calculate the predicted time-to-contact TTC. Then, it is determined whether the predicted time-to-contact TTC is less than or equal to the alarm threshold value TTC1, less than or equal to the preliminary braking threshold value TTC2, and less than or equal to the main braking threshold value TTC3. When the predicted time-to-contact TTC becomes less than or equal to the alarm threshold value TTC1, an automatic brake control using an alarm is started. When the predicted time-to-contact TTC becomes less than or equal to the preliminary braking threshold value TTC2, preliminary braking with slow braking in addition to the alarm is started. When the predicted time-to-contact TTC becomes less than or equal to the main braking threshold value TTC3, main braking with sudden braking in addition to the alarm is started. "TTC" is an acronym for "Time To Collision."

After automatic brake control is started, the matching determination processing unit 32 carries out a comparison to determine whether or not a pedestrian candidate detected by the front camera unit 1 matches an object detected by the reflected waves from the millimeter wave radar 2. That is, an allowable error region is set with the position information of the pedestrian candidate detected by the front camera unit 1 as the center point. Then, the position information of the object closest to the pedestrian candidate is selected from the position information in accordance with the directions/distances of a plurality of objects that are detected by reflected waves from the millimeter wave radar 2. A comparison is made to determine whether or not the position information of the object selected from the millimeter wave radar 2 is present within the allowable error region. Then, when the integrated value of the time during which it is determined that the selected object is present within the allowable error region passes a predetermined period of time (for example, 200 msec), a match is considered to have been established, the pedestrian candidate detected by the front camera unit 1 is determined to be a pedestrian as the control target, and automatic brake control is continued. On the other hand, if it is determined that a match has not been established, even when a predetermined time has elapsed after the matching determination is started, it is determined that the pedestrian candidate detected by the front camera unit 1 is not a pedestrian as the control target, and automatic brake control is canceled.

The control command calculation unit 33 receives the processing result from the object determination processing unit 32 to calculate a control command, and outputs command signals to the electrically controlled brake unit 4, the combination meter 5, and the brake hold relay 9, via the CAN communication line. The control command calculation unit outputs a brake fluid pressure command signal to the electrically controlled brake unit 4 for carrying out preliminary braking with slow braking when the predicted time-to-contact TTC becomes less than or equal to the preliminary braking threshold value TTC2, and outputs a brake fluid pressure command signal for carrying out main braking with sudden braking when the predicted time-to-contact TTC becomes less than or equal to the main braking threshold value TTC3. The control command calculation unit outputs, to the combination meter 5, a buzzer output signal for sounding an alarm buzzer 6, a warning indication signal for flashing or lighting the brake warning lamp 7, and a meter display signal for lighting the brake warning display 8, when the predicted time-to-contact TTC becomes less than or equal to the alarm threshold value TTC1. The control command calculation unit outputs, to the brake hold relay 9, a stop lamp drive signal for bypassing the stop lamp circuit and lighting the stop lamp 10 when the predicted time-to-contact TTC becomes less than or equal to the preliminary braking threshold value TTC2.

Configuration of the Automatic Brake Control Process

Figure 2:
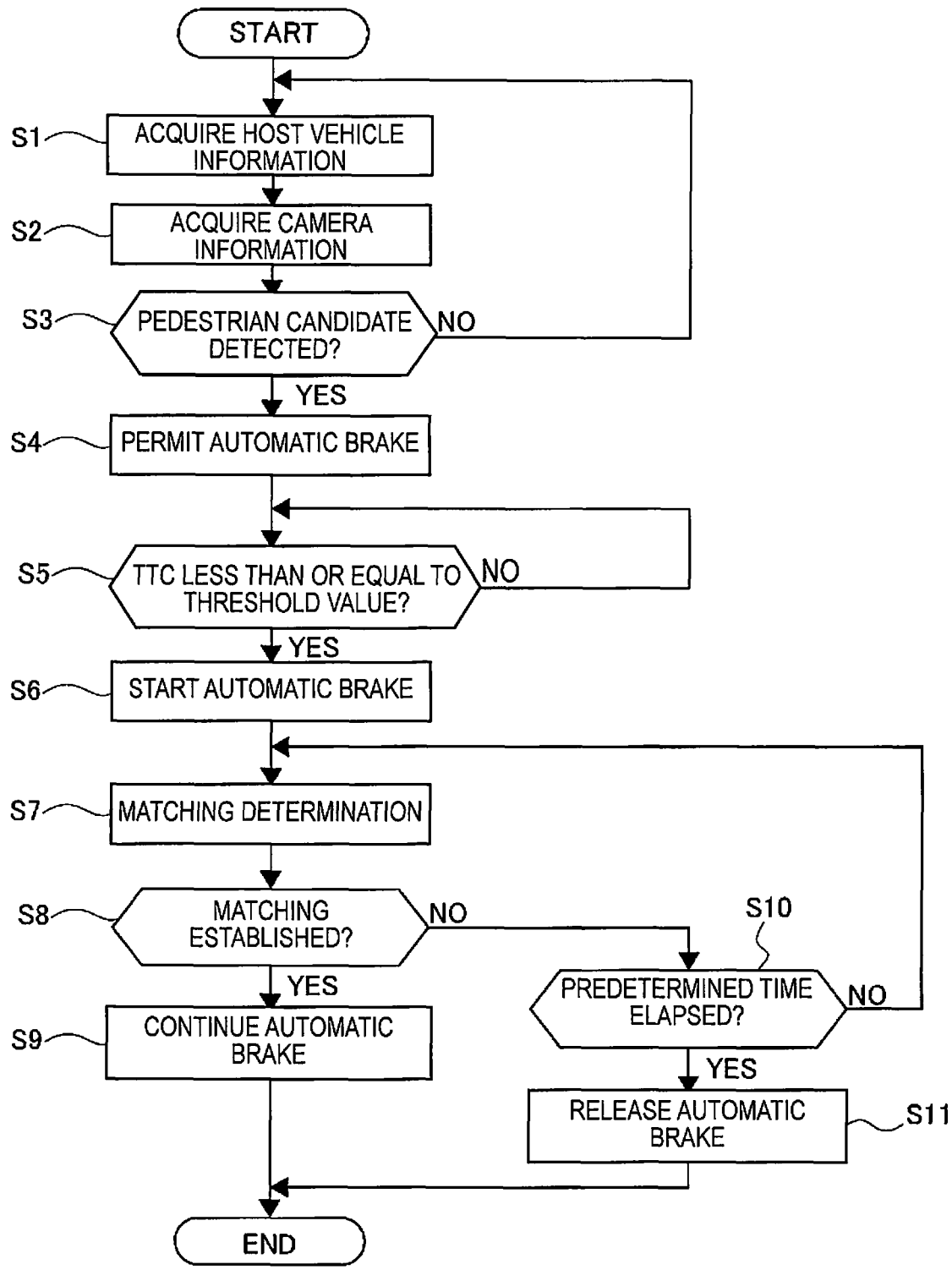
FIG. 2 is a flowchart illustrating the flow of an automatic brake control process that is executed by the driving assist controller of the first embodiment when the control target is a pedestrian.

FIG. 2 illustrates the flow of an automatic brake control process that is executed by the driving assist controller 3 of the first embodiment when the control target is a pedestrian. Each of the steps in FIG. 2, which represent the configuration of the automatic brake control process, will be described below.

In Step S1, the host vehicle information is acquired and the process proceeds to Step S2. Here, "host vehicle information" refers to wheel speed, accelerator position opening amount, brake switch, brake fluid pressure, shift position, steering angle, steering angular velocity, acceleration, yaw rate, system ON/OFF state, and the like, which are received from various on-board controllers using CAN communication signals.

In Step S2, following the acquisition of the host vehicle information in Step S1, camera information is acquired from the front camera unit 1, and the process proceeds to Step S3. Here, "camera information" refers to image information in front of the vehicle that is acquired from the front camera unit 1.

In Step S3, following the acquisition of the camera information in Step S2, it is determined whether or not a pedestrian candidate has been detected based on the camera information. If YES (pedestrian candidate detected), the process proceeds to Step S4, and if NO (pedestrian candidate not detected), the process returns to Step S1. Here, the "detection of a pedestrian candidate" is carried out by a well-known pedestrian candidate detection method, in which various objects that are present in front of the vehicle are detected based on the image information from the front camera unit 1, and a pedestrian candidate is further detected from the plurality of objects, including preceding vehicles.

As disclosed in Japanese Laid-Open Patent Application No. 2009-294842, in an example of a well-known pedestrian candidate detection method, a feature point is extracted from an image captured by a camera, and a target region that includes a three-dimensional target object is extracted based on the movement information of the extracted feature point. The movement information relating to the target region is then compared with movement information relating to a comparison region that is set around the target region, and it is detected whether or not the target three-dimensional object is a pedestrian candidate based on the comparison result. In addition, as disclosed in Japanese Laid-Open Patent Application No. 2013-228915, a region in which a pedestrian's foot may be present is extracted from an image captured by a camera, and processing regions set within the extracted candidate region are divided into two classes. A histogram is then created representing the distribution of the degree of separation of the brightness values between the two classes, and it is detected whether or not the three-dimensional target object is a pedestrian candidate based on the shape of the created histogram of the degree of separation. Furthermore, as disclosed in Japanese Laid-Open Patent Application No. 2014-35560, a threshold value, which is used when determining whether or not some of the movement speed information that is detected within the region of interest represents darting out, changes, depending on whether the host vehicle is traveling in a straight line or turning, thereby more rapidly detecting a pedestrian candidate appearing from a blind spot.

In Step S4, following the determination that a pedestrian candidate has been detected in Step S3, execution of the automatic brake control is permitted, and the process proceeds to Step S5. Here, "permission to execute the automatic brake control" means to permit an automatic brake control that shifts from the alarm mode→the preliminary braking mode→the main braking mode, when, for example, the predicted time-to-contact TTC when a pedestrian candidate is detected gradually decreases from a value that exceeds the alarm threshold value TTC1.

In Step S5, following the permission to execute the automatic brake control in Step S4, it is determined whether the predicted time-to-contact TTC is less than or equal to the alarm threshold value TTC1, less than or equal to the preliminary braking threshold value TTC2, and less than or equal to the main braking threshold value TTC3. If YES (TTC≤TTC1, TTC2, TTC3), the process proceeds to Step S6, and if NO (TTC>TTC1), the determination of Step S5 is repeated. Here, the "alarm threshold value TTC1," the "preliminary braking threshold value TTC2," and the "main braking threshold value TTC3" are set to have the relationship: alarm threshold value TTC1>preliminary braking threshold value TTC2>main braking threshold value TTC3, as shown in the TTC threshold map of FIG. 3.

Figure 3:
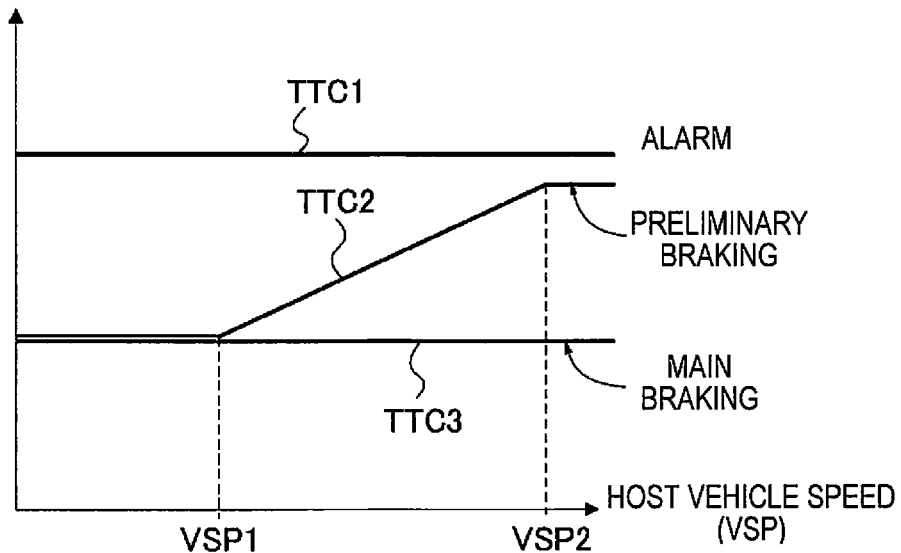
FIG. 3 is a TTC threshold map illustrating an alarm threshold value TTC1, a preliminary braking threshold value TTC2, and a main braking threshold value TTC3, which are used in the automatic brake control of the first embodiment.

To describe the TTC threshold value in more detail based on the TTC threshold map illustrated in FIG. 3: the alarm threshold value TTC1 is set to a value of a constant high predicted time-to-contact TTC regardless of the host vehicle speed (VSP). The preliminary braking threshold value TTC2 in a vehicle speed region of host vehicle speed≤first speed VSP1 is set to a constant value that matches the main braking threshold value TTC3. The preliminary braking threshold value TTC2 in a vehicle speed region of first speed VSP1<host vehicle speed<second speed VSP2 is set to have a characteristic that increases proportionally with the host vehicle speed (VSP). The preliminary braking threshold value TTC2 in a vehicle speed region of host vehicle speed≥second speed VSP2 is set to a constant value that is slightly smaller than the alarm threshold value TTC1. The main braking threshold value TTC3 is set to a value of a constant low predicted time-to-contact TTC regardless of the host vehicle speed (VSP). That is, in a low vehicle speed region of host vehicle speed≤first speed VSP1, there is no preliminary braking, and an automatic brake control with an alarm and main braking is carried out. In a vehicle speed region of first speed VSP1<host vehicle speed<second speed VSP2, the TTC region of preliminary braking becomes wider as the host vehicle speed increases, and the TTC region of preliminary braking becomes narrower as the host vehicle speed decreases. If the control target in the automatic brake control is a preceding vehicle, an automatic brake control is carried out, where the horizontal axis of the TTC threshold map represents the relative speed between the host vehicle and the preceding vehicle.

Figure 4:
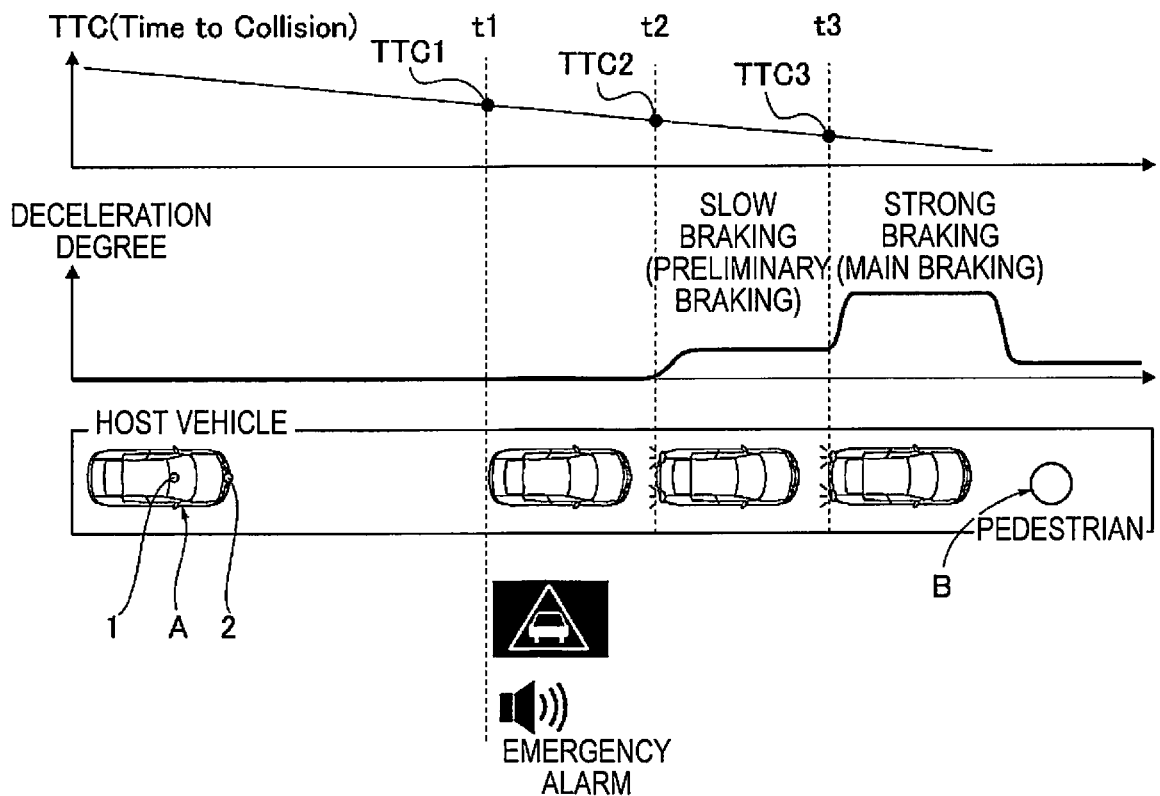
FIG. 4 is a time chart illustrating the automatic brake mode transition of an alarm mode, a preliminary braking mode, and a main braking mode, when the predicted time-to-contact TTC of the host vehicle and a pedestrian when the automatic brake control of the first embodiment is carried out decreases at a constant gradient.

In Step S6, following the determination that TTC≤TTC1, TTC2, TTC3 in Step S5, an automatic brake control is started, and the process proceeds to Step S7. Here, if the predicted time-to-contact TTC when an automatic brake control is permitted due to the detection of a pedestrian candidate is less than or equal to the alarm threshold value TTC1, an automatic brake control that shifts from alarm mode→preliminary braking mode→main braking mode is started, as illustrated in FIG. 4. If the predicted time-to-contact TTC when an automatic brake control is permitted due to the detection of a pedestrian candidate is less than or equal to the preliminary braking threshold value TTC2, an automatic brake control in which the mode shifts from preliminary braking mode (alarm)→main braking mode (alarm) is started. Additionally, if the predicted time-to-contact TTC when an automatic brake control is permitted due to the detection of a pedestrian candidate is less than or equal to the main braking threshold value TTC3, an automatic brake control for executing the main braking mode (alarm) is started.

The mode transition of the alarm mode, the preliminary braking mode, and the main braking mode, when the predicted time-to-contact TTC of the host vehicle and a pedestrian when the automatic brake control is carried out decreases at a constant gradient will be described with reference to the automatic brake time chart illustrated in FIG. 4. An automatic brake control is not started during the period up to time t1 when the predicted time-to-contact TTC of the host vehicle A and a pedestrian B is greater than the alarm threshold value TTC1. When the predicted time-to-contact TTC becomes less than or equal to the alarm threshold value TTC1 at time t1, driving assist from an emergency alarm, which notifies the driver visually and audibly using a warning indication or a buzzer, is started. When the predicted time-to-contact TTC becomes less than or equal to the preliminary braking threshold value TTC2 at time t2, preliminary braking with slow braking in addition to an emergency alarm is started. When the predicted time-to-contact TTC becomes less than or equal to the main braking threshold value TTC3 at time t3, main braking with sudden braking in addition to an emergency alarm is started, and contact between the host vehicle A and the pedestrian B is avoided. Regarding this automatic brake control, control according to the same mode transition is continuously carried out regardless of whether or not a matching determination is established.

In Step S7, following the starting of the automatic brake control in Step S6, or the determination that a predetermined time has not elapsed in Step S10, a comparison determination is made regarding whether or not a pedestrian candidate detected by the front camera unit 1 matches an object detected by the reflected waves from the millimeter wave radar 2, and the process proceeds to Step S8. The "matching determination" process includes setting an allowable error region with the position information of the pedestrian candidate detected by the front camera unit 1 as the center point. Then, the position information of the object closest to the pedestrian candidate is selected from among the position information in accordance with the directions/distances of a plurality of objects that are detected by reflected waves from the millimeter wave radar 2. Finally, whether or not the position information of the object selected from the millimeter wave radar 2 is present within the allowable error region is determined by comparison.

Figure 5:
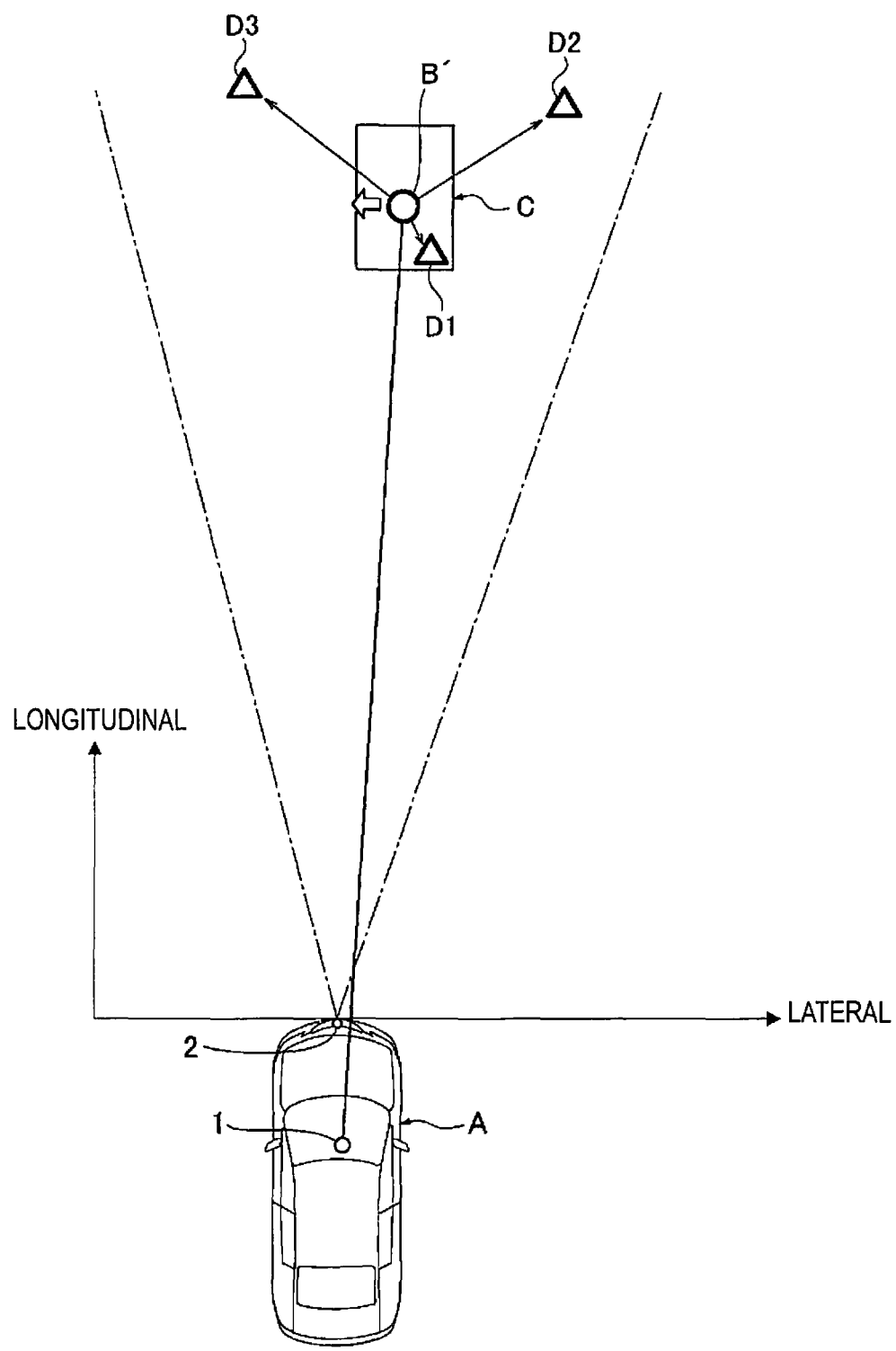
FIG. 5 is a matching determination schematic explanatory view illustrating a general overview of a matching determination in an automatic brake control process that is executed by the driving assist controller according to the first embodiment.

A general overview of the matching determination will now be described with reference to FIG. 5. For example, in a scenario in which a pedestrian candidate B' is present in front of the host vehicle A, a rectangular or circular allowable error region C is set with the pedestrian candidate B' as the center point, as illustrated in FIG. 5. An object D1 that is closest to the pedestrian candidate B' is then selected from among a plurality of objects D1, D2, D3 (laser detected objects). Then, the time during which the object D1 is present within the allowable error region C is counted.

In Step S8, following the matching determination in Step S7, it is determined whether or not a match has been established. If YES (match established), the process proceeds to Step S9, and if NO (match not established), the process proceeds to Step S10. Here, when the integrated value (counted time) of the time during which it is determined that the object D1 selected from the millimeter wave radar 2 is present within the allowable error region C exceeds a matching determination time (for example, 200 msec), it is considered that a "match is established." On the other hand, when the object D1 selected from the millimeter wave radar 2 is not present within the allowable error region C, or, when the object D1 selected from the millimeter wave radar 2 is temporarily present within the allowable error region C but the integrated value is less than the matching time, it is considered that a "match is not established."

In Step S9, following the determination that a match has been established in Step S8, the pedestrian candidate B' detected by the front camera unit 1 is determined to be a pedestrian B as the control target, the automatic brake control is continued, and the process proceeds to END. Here, when pedestrian B as the control target is determined due to the establishment of a match, the allowable deceleration G is set higher (for example, about 1.0 G) than the allowable deceleration G (for example, about 0.6 G) in the automatic brake control before the establishment of a match but while the pedestrian candidate B' is being detected. In terms of the automatic brake control rule itself, the automatic brake control is continued by setting the same control rule regardless of whether or not matching is established.

In Step S10, following the determination that a match has not been established in Step S8, it is determined whether or not a predetermined time T has elapsed after the matching determination was started. If YES (predetermined time T has elapsed), the process proceeds to Step S11, and if NO (predetermined time T has not elapsed), the process returns to Step S7. Here, the "predetermined time T" is set to a time obtained by adding a margin time to the time required to determine a pedestrian B as the control target, when a pedestrian candidate B' detected by the front camera unit 1 is a pedestrian that actually exists.

In Step S11, following the determination that a predetermined time T has elapsed in Step S10, the automatic brake control is canceled, and the process proceeds to END. That is, if it is determined that matching is not established, even when a predetermined time T has elapsed after starting the matching determination, it is determined that the pedestrian candidate B' detected by the front camera unit 1 is not a pedestrian B as the control target. When canceling the automatic brake control, when in the alarm mode, the alarm is stopped, and when in the preliminary braking mode or the main braking mode, the alarm is stopped and the braking force that is imparted by the automatic brake control is released. The braking force release control is a control for releasing the braking force while suppressing a sudden change in the behavior of the vehicle; for example, a control is carried out in which the braking force at the time of automatic brake release is gradually reduced, or, the braking force at the time of automatic brake release is maintained for a predetermined time and then gradually released.

Next, the actions are described. The "action of the automatic brake control process," "action of the automatic brake control," and "characteristic action of the automatic brake control" will be described separately, regarding the actions of the driving assist control method and control device for an electrically driven vehicle according to the first embodiment.

Action of the Automatic Brake Control Process

The action of the automatic brake control process will be described below, based on the flowchart of FIG. 2. When a pedestrian candidate B' is not detected based on camera information, the process that proceeds from Step S1→Step S2→Step S3 in the flowchart of FIG. 2 is repeated. Then, when a pedestrian candidate B' is detected based on camera information, the process proceeds from Step S3 to Step S4, and in Step S4, the execution of an automatic brake control is permitted.

When execution of an automatic brake control is permitted in Step S4, the process proceeds from Step S4 to Step S5, and in Step S5, it is determined whether the predicted time-to-contact TTC is less than or equal to the alarm threshold value TTC1, less than or equal to the preliminary braking threshold value TTC2, and less than or equal to the main braking threshold value TTC3. When it is determined that TTC≤TTC1, or TTC≤TTC2, or TTC≤TTC3 in Step S5, the process proceeds to Step S6, and in Step S6, an automatic brake control is started. Here, when it is determined that TTC≤TTC1, an automatic brake control that shifts from alarm mode→preliminary braking mode→main braking mode is started. When it is determined that TTC≤TTC2, an automatic brake control in which the mode shifts from preliminary braking mode (alarm)→main braking mode (alarm) is started. When it is determined that TTC≤TTC3, an automatic brake control for executing the main braking mode (alarm) is started.

When automatic brake control is started in Step S6, the process proceeds from Step S6 to Step S7, and in Step S7, a comparison determination is made regarding whether or not a pedestrian candidate B' detected by the front camera unit 1 matches an object D1 detected by the reflected waves from the millimeter wave radar 2. In addition, while matching is not established and the predetermined time T has not elapsed, the process that proceeds from Step S7→Step S8→Step S10 is repeated.

When it is determined that matching is established in Step S8 while the process that proceeds from Step S7→Step S8→Step S10 is being repeated, the process proceeds from Step S8 to Step S9→END. In Step S9, the pedestrian candidate B' detected by the front camera unit 1 is determined to be pedestrian B as the control target, the allowable deceleration G is increased, and the automatic brake control is continued.

On the other hand, if the predetermined time T elapses while the process that proceeds from Step S7→Step S8→Step S10 is being repeated, the process proceeds from Step S10 to Step S11→END. In Step S11, the pedestrian candidate B' detected by the front camera unit 1 is determined not to be pedestrian B as the control target, and the automatic brake control is canceled.

In this manner, in the automatic brake control process, when a pedestrian candidate B' is detected in front of the host vehicle A based on an image signal from the front camera unit 1, execution of an automatic brake control is permitted, with the detected pedestrian candidate B' as the control target (Step S4). Then, after starting the automatic brake control, a comparison determination is made regarding whether or not the pedestrian candidate B' detected by the front camera unit 1 matches an object D1 detected by the reflected waves from the millimeter wave radar 2 (Step S7).

Then, if matching is established before a predetermined time T elapses, the automatic brake control is continued (Step S9), and if matching is not established before a predetermined time T elapses, the automatic brake control is canceled (Step S11).

Action of the Automatic Brake Control

Figure 6:
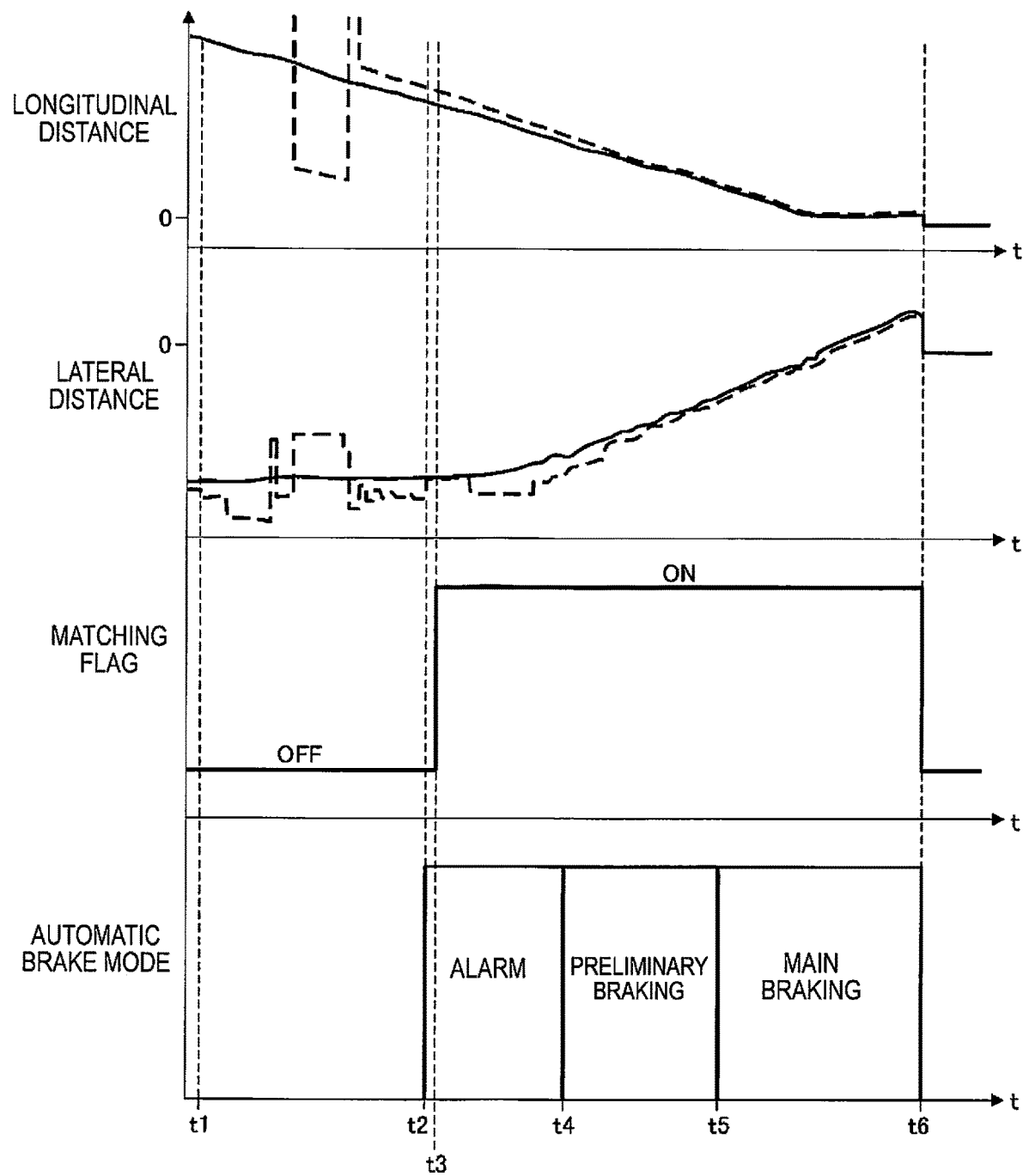
FIG. 6 is a time chart illustrating the respective characteristics of longitudinal distance, lateral distance, a matching flag, and an automatic brake mode, in a scenario in which a pedestrian crosses a forward position on a predicted path of the host vehicle.

The action of the automatic brake control when a pedestrian B crosses a forward position on a predicted path of the host vehicle A, as illustrated in FIG. 5, will be described with reference to FIG. 6. In FIG. 6, the longitudinal distance refers to the distance between the host vehicle A and the pedestrian candidate B' (pedestrian B) in the vertical direction of FIG. 5, and longitudinal distance=0 becomes the contact distance in the longitudinal direction. The lateral distance refers to the distance between the host vehicle A and the pedestrian candidate B' (pedestrian B) in the lateral direction, and lateral distance=0 becomes the contact distance in the lateral direction.

When a pedestrian candidate B' that is present in front of the host vehicle A is detected based on an image signal from the front camera unit 1 at time t1, execution of an automatic brake control is permitted, and monitoring of the predicted time-to-contact TTC is started. When the predicted time-to-contact TTC becomes less than or equal to the alarm threshold value TTC1 at time t2, an automatic brake control using an alarm is started, and a matching determination between the detected pedestrian candidate B' and an object D1 detected by the reflected waves from the millimeter wave radar 2 is started. When it is determined that a match is established at time t3 (matching flag ON), the automatic brake control that was started with the pedestrian candidate B' as the control target is continued. Then, when the predicted time-to-contact TTC becomes less than or equal to the preliminary braking threshold value TTC2 at time t4, automatic brake control with an alarm and preliminary braking is started. Furthermore, when the predicted time-to-contact TTC becomes less than or equal to the main braking threshold value TTC3 at time t5, automatic brake control with an alarm and main braking is started. Then, when the deceleration G is increased by the main braking and time t6 is reached, the host vehicle A stops immediately in front of the pedestrian B.

Next, as an example of a scenario in which it is beneficial to permit the execution of automatic brake control sooner, the action of automatic braking will be described for a scenario in which a pedestrian B darts out in front of the host vehicle A and into the predicted path of the host vehicle A from a stopped vehicle E (blind spot), with reference to FIG. 7.

In the scenario in which a pedestrian B darts out into the predicted path of the host vehicle A from a stopped vehicle E, if pedestrian detection is carried out based on information from the front camera unit 1, it is possible to detect a pedestrian using shape recognition. However, if object detection (pedestrian detection) is carried out based on information from the millimeter wave radar 2, since the stopped vehicle E and the pedestrian B are detected as an integral object, as illustrated in the right-hand portion of FIG. 7, pedestrian detection cannot be started until enough time has elapsed to ensure that there is sufficient space between the stopped vehicle E and the pedestrian B.

Figure 7:
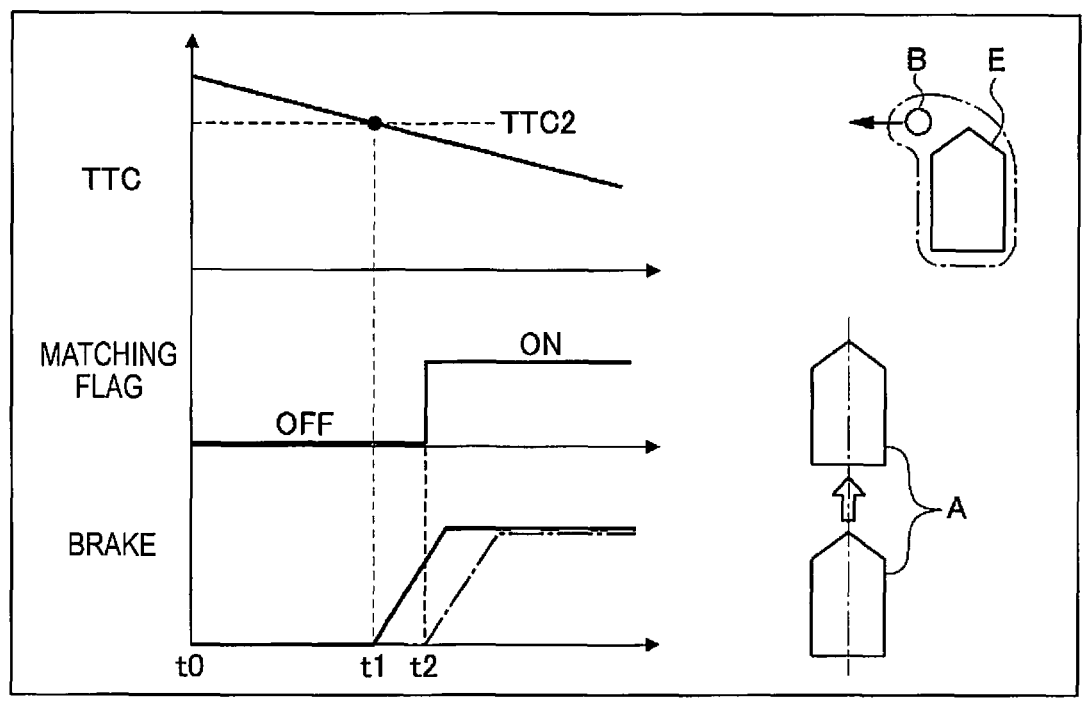
FIG. 7 is a time chart illustrating the respective characteristics of TTC, matching flag, and brake, in a scenario in which a pedestrian darts out in front of the host vehicle and into the predicted path of the host vehicle from a stopped vehicle.

Therefore, if an automatic brake control is started after waiting for the establishment of a match, the starting of the automatic brake control is delayed, such as the preliminary braking being started after time t2, as illustrated in FIG. 7.

In contrast, if a pedestrian candidate B' is detected based on information from the front camera unit 1, and if execution of an automatic brake control is permitted without waiting for the comparison determination result (established matching), the execution of the automatic brake control is permitted at, for example, time t0, and the preliminary braking is started at time t1; thus, the starting of the automatic brake control takes place sooner.

Next, as an example of a scenario in which it is beneficial to make a comparison determination with regard to the detection information of the front camera unit 1 and the millimeter wave radar 2, the action of automatic braking will be described for a scenario in which white smoke exhaust gas G is being emitted from a preceding vehicle F that is present on a predicted path in front of the host vehicle A, with reference to FIG. 8.

Figure 8:
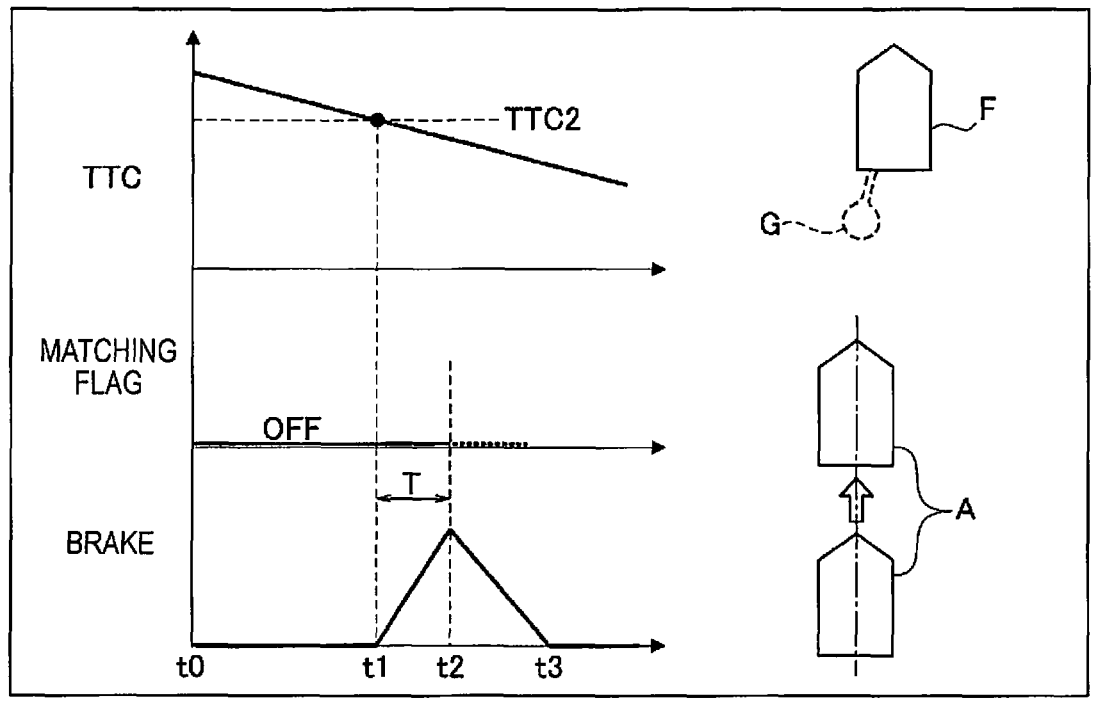
FIG. 8 is a time chart illustrating the respective characteristics of TTC, matching flag, and brake, in a scenario in which white smoke exhaust gas is being emitted from a preceding vehicle that is present in front of the host vehicle in the predicted path thereof.

In a scenario in which white smoke exhaust gas G is being emitted from a preceding vehicle F, in the case of object detection based on information from the front camera unit 1, there are cases in which the white smoke exhaust gas G is erroneously detected as a pedestrian due to the use of shape recognition, as illustrated in the right-hand portion of FIG. 8. On the other hand, when object detection based on information from the millimeter wave radar 2 is carried out, since the reflected waves of irradiated millimeter waves are used, the white smoke exhaust gas G will not be erroneously detected as a pedestrian.

Therefore, when a pedestrian candidate B' is detected based on information from the front camera unit 1 and the predicted time-to-contact TTC becomes less than or equal to the preliminary braking threshold value TTC2, even if preliminary braking is started at time t1, the millimeter wave radar 2 does not detect an object, and a predetermined time T elapses while a match remains unestablished. Accordingly, the automatic brake control is canceled at time t2, after which the braking force that is imparted by the preliminary braking is gradually reduced, and the actual cancellation of the braking force is achieved at time t3.

Characteristic Action of the Automatic Brake Control

In the first embodiment, when an object that is present in front of the host vehicle A is detected to be a pedestrian candidate B' based on an image signal from the front camera unit 1, execution of an automatic brake control is permitted, with the detected pedestrian candidate B' as the control target. A comparison is then made to determine whether or not a pedestrian candidate B' detected by the front camera unit 1 matches an object detected by the reflected waves from the millimeter wave radar 2. Then, it is determined whether or not to continue execution of the automatic brake control based on the comparison determination result (matching determination result).

That is, when detecting a pedestrian B that is present in front of the host vehicle using the front camera unit 1 and the millimeter wave radar 2, the front camera unit 1 and the millimeter wave radar 2 have the following advantages and disadvantages.

The front camera unit 1 has the advantage that it is possible using shape recognition to make a determination by independently discriminating a moving object having a human shape as a pedestrian. However, there is the disadvantage that there are cases in which objects are erroneously detected, such as during bad weather, when there is backlighting ahead, when an object blends into the background colors, when there are road markers, and when the exhaust smoke gas is extremely dense.

On the other hand, the millimeter wave radar 2 has the advantage that it can detect an object that is relatively far away, that it is relatively unaffected by bad weather, and that backlighting is not an issue; therefore, the object recognition capability is greater compared to the front camera unit 1 when an object is present in front of the host vehicle. However, there is the disadvantage that is it practically impossible to distinguish whether an object is a preceding vehicle or a pedestrian.

With regard to the advantages and disadvantages of the front camera unit 1 and the millimeter wave radar 2 described above: when a pedestrian candidate B' is detected based on camera information that is capable of independently detecting a pedestrian using shape recognition, execution of an automatic brake control is permitted on a first-out basis, without waiting for the comparison determination result. Thereafter, when a pedestrian B is present in front of the host vehicle A, information from the millimeter wave radar 2, which has greater object recognition capability than the front camera unit 1, is used for a comparison determination to determine whether or not to continue the execution of the automatic brake control, thereby providing backup with respect to the reliability of the camera detection result.

Therefore, if a pedestrian candidate B' is detected by the front camera unit 1, execution of an automatic brake control is immediately permitted. Accordingly, the start timing of the automatic brake control comes earlier compared to waiting for the comparison determination results of a pedestrian B from both the front camera unit 1 and the millimeter wave radar 2. Thereafter, it is determined using comparison whether or not the pedestrian candidate B' detected by the front camera unit 1 matches an object detected by reflected waves from the millimeter wave radar 2, and it is determined whether or not to continue execution of the driving assist control based on the result of the comparison determination. Accordingly, the function of preventing the erroneous determination of a pedestrian B is ensured.

In the first embodiment, an allowable error region C is set with the position information in accordance with the direction or distance of the pedestrian candidate B' detected by the front camera unit 1 as the center point, and from among the plurality of objects detected by reflected waves from the millimeter wave radar 2, the position information in accordance with the direction or distance of the object D1 that is closest to the pedestrian candidate B', is used for comparison determination. If the position information detected by the millimeter wave radar 2 matches within the allowable error region C for a determination time, the pedestrian candidate B' detected by the front camera unit 1 is determined to be a pedestrian B as the control target.

For example, when the two pieces of position information are compared and the pedestrian candidate B' detected by the front camera unit 1 is determined to be a pedestrian B under the condition that the two positions match, although the determination accuracy is ensured, the pedestrian determination requires time. On the other hand, if the pedestrian candidate B' detected by the front camera unit 1 is determined to be a pedestrian B only by the two pieces of position information entering the allowable error region, although the pedestrian determination responsiveness is ensured, the determination accuracy decreases.

In contrast, when determining the presence of a pedestrian B, as the control target, it is possible both to ensure the accuracy of the pedestrian determination and to improve the pedestrian determination responsiveness by using a comparison determination method that determines whether an object is present within an allowable error region C for a given determination time.

In the first embodiment, when the execution of driving assist control is permitted, driving assist control with an alarm and automatic brake control is executed. When the possibility of contact with a pedestrian B is in a first stage (TTC≤TTC1), driving assist with an alarm is initiated, and when in a second stage (TTC≤TTC2), in which the possibility of contact with the pedestrian B is greater than in the first stage, preliminary braking using an alarm and slow braking is initiated. Then, when in a third stage (TTC≤TTC3), in which the possibility of contact with the pedestrian is greater than in the second stage, main braking using an alarm and sudden braking is started.

That is, the alarm has the function of notifying the driver that there is the possibility of contact between the host vehicle A and a pedestrian B using audible assistance and visual assistance. The preliminary braking using slow braking has the function of notifying the driver that there is the possibility of contact between the host vehicle A and a pedestrian B using body sensory assistance, and also has the function of preliminarily decelerating the vehicle so that the vehicle can be stopped when starting main braking using sudden braking. The main braking using sudden braking has the function of avoiding contact by decelerating and stopping the host vehicle A before the host vehicle A comes in contact with a pedestrian B.

Therefore, when driving assist is executed control using an alarm and automatic brake control, contact avoidance using the driver's brake operation or steering operation is enhanced by providing gradual driving assist to the driver, to reduce the frequency of operation of the automatic brake control. In addition, in a situation in which there is no time to wait for a braking operation by the driver, the possibility of avoiding contact between the host vehicle A and the pedestrian B is increased by automatic operation of preliminary braking→main braking, or, by main braking. In other words, with the combination of the earlier start time for the automatic brake control and the gradual driving assist, there will be more scenarios in which avoidance of contact between the host vehicle A and a pedestrian B is achieved.

In the first embodiment, when shifting from the detection of a pedestrian candidate B' using the front camera unit 1 to the determination of the presence of a pedestrian B using comparison determination that includes the millimeter wave radar 2, the permitted deceleration G of the automatic brake control is set to be faster than the permitted deceleration G while the pedestrian candidate B' is being detected. That is, the reliability of pedestrian determination is greater when the presence of a pedestrian B is determined using comparison determination compared with when a pedestrian candidate B' is detected using the front camera unit 1. Then, when a pedestrian candidate B' is detected, and it is later determined that the pedestrian candidate B' is not a pedestrian according to a comparison determination, the automatic brake control will be canceled midway. Therefore, by suppressing the deceleration G that is permitted by the automatic brake control while a pedestrian candidate B' is being detected by the front camera unit 1, it is possible to prepare for the cancellation of the automatic brake control during deceleration of the host vehicle A. Then, if the presence of pedestrian B is determined using the comparison determination, by increasing the deceleration G that is permitted by the automatic brake control, the distance required for the vehicle to stop is reduced, and, for example, the operation of automatic brake control, which is extended to the high-speed region at the time of an emergency, such as the darting out of a pedestrian, is ensured.

Next, the effects are described. The effects listed below can be realized by the driving assist control method and control device for an electrically driven vehicle according to the first embodiment.

(1) External environment recognition sensors that acquire forward information of a host vehicle A are provided, and a driving assist control (automatic brake control) for avoiding contact between the host vehicle A and a pedestrian B is executed, when a pedestrian B is detected by the external environment recognition sensors. In this driving assist control method for a vehicle, a camera (front camera unit 1) and a radar (millimeter wave radar 2) are provided as the external environment recognition sensors. When an object that is present in front of the host vehicle A is detected to be a pedestrian candidate B' based on an image signal from the camera (front camera unit 1), the execution of driving assist control (automatic brake control) is permitted, with the detected pedestrian candidate B' as the control target. Thereafter, it is determined using comparison whether or not the pedestrian candidate B' detected by the camera (front camera unit 1) matches an object D1 detected by the reflected waves from the radar (millimeter wave radar 2), and it is determined whether or not to continue the execution of the driving assist control (automatic brake control) based on the result of the comparison determination (FIG. 2). Thus, it is possible to provide a driving assist control method for a vehicle that realizes an earlier start time for starting a driving assist control (automatic brake control), while ensuring the function of preventing erroneous determination of a pedestrian B during travel.

(2) In the comparison determination, an allowable error region C is set with the position information in accordance with the direction or distance of the pedestrian candidate B' detected by the camera (front camera unit 1) as the center point. When the position information in accordance with the direction or distance of an object D1 that is closest to the pedestrian candidate B' from among a plurality of objects detected by the reflected waves from the radar (millimeter wave radar 2) matches within the allowable error region C for a predetermined period of time, the pedestrian candidate B' detected by the camera (front camera unit 1) is determined to be a pedestrian B as the control target (FIG. 5). Thus, in addition to the effect of (1), when a comparison determination is made regarding a pedestrian B as the control target, it is possible both to ensure the accuracy of the pedestrian determination and to improve the pedestrian determination responsiveness.

(3) When the execution of driving assist control is permitted, the driving assist control is executed using an alarm and automatic brake control, and when the possibility of contact with a pedestrian B is in a first stage (TTC≤TTC1), driving assist using an alarm is initiated. When in a second stage (TTC≤TTC2), in which the possibility of contact with the pedestrian B is greater than in the first stage, preliminary braking using an alarm and slow braking is initiated. When in a third stage (TTC≤TTC3), in which the possibility of contact with a pedestrian is greater than in the second stage, main braking using an alarm and sudden braking is started (FIG. 4). Thus, in addition to the effect of (1) or (2), when driving assist control is executed using an alarm and automatic brake control, the frequency of operation of the automatic brake control can be reduced by providing gradual driving assist to the driver, and there will be more scenarios in which in which avoidance of contact between the host vehicle A and a pedestrian B is achieved.

(4) The automatic brake control is configured such that, when shifting from the detection of a pedestrian candidate B' using the camera (front camera unit 1) to the determination of the presence of a pedestrian B using comparison determination that includes the radar (millimeter wave radar 2), the permitted deceleration G of the automatic brake control is set to be faster than the permitted deceleration G while the pedestrian candidate B' is being detected (FIG. 2). Thus, in addition to the effect of (3), it is possible to prepare for the cancellation of the automatic brake control while the pedestrian candidate B' is being detected, and, if a pedestrian B is determined, it is possible to ensure an operation of the automatic brake control that is extended to the high-speed region.

(5) Provided are external environment recognition sensors that acquire forward information of a host vehicle A and a driving assist controller 3 that executes driving assist control (automatic brake control) for avoiding contact between the host vehicle A and a pedestrian B, when a pedestrian B is detected by the external environment recognition sensors. In this driving assist control device for a vehicle, a camera (front camera unit 1) and a radar (millimeter wave radar 2) are provided as the external environment recognition sensors. The driving assist controller 3 permits execution of the driving assist control (automatic brake control), with a determined pedestrian candidate B' as the control target, when an object that is present in front of the host vehicle A is determined to be the pedestrian candidate B' based on an image signal from the camera (front camera unit 1). Thereafter, the driving assist controller carries out a control process to determine using comparison whether or not the pedestrian candidate B' detected by the camera (front camera unit 1) matches an object D1 detected by reflected waves from the radar (millimeter wave radar 2), and to determine whether or not to continue execution of the driving assist control (automatic brake control) based on the comparison determination result (FIG. 2). Accordingly, it is possible to provide a driving assist control device for a vehicle that achieves an earlier start time for starting driving assist control (automatic brake control), while ensuring a function for preventing erroneous determination of a pedestrian B during travel.

The driving assist control method and control device for a vehicle of the present invention were described above based on a first embodiment, but specific configurations thereof are not limited to this first embodiment, and various modifications and additions to the design can be made without departing from the scope of the invention in accordance with each claim of the Claims.

In the first embodiment, an example was shown in which a front camera unit 1, which is a single camera (monocular camera), is used as the camera. However, a stereo camera configured from a pair of front cameras may be used as the camera.

In the first embodiment, an example was presented in which a millimeter wave radar 2, which irradiates millimeter waves toward the front of the vehicle, is used as the radar. However, an infrared laser radar may be used, or a millimeter wave radar and an infrared laser radar may be used in combination, as the radar.

In the first embodiment, an example of an automatic brake control including an alarm was presented as the driving assist control. However, the driving assist control may be other driving assist controls, such as a driving assist control that avoids contact by controlling the host vehicle to avoid a pedestrian by braking and steering, as long as the control is one in which a pedestrian that is present in front of the host vehicle is the control target.

In the first embodiment, as the comparison determination, an example of a matching determination was presented, in which an allowable error region C is set with position information in accordance with the direction or distance of the pedestrian candidate B' detected by the front camera unit 1 as the center point. However, the comparison determination may be configured to determine whether or not the position information in accordance with the direction or distance of the pedestrian candidate determined by the front camera unit matches an object detected by reflected waves from the millimeter wave radar within an allowable error range, without setting an allowable error region.

In the first embodiment, a control example was presented in which the mode shifts from alarm mode→preliminary braking mode→main braking mode, as the automatic brake control. However, the automatic brake control may be configured from the alarm mode and a braking mode.

In the first embodiment, an example was presented in which matching determination is started at the same time that automatic brake control is started, after permitting execution of the automatic brake control. However, the matching determination may be started immediately after permitting the execution of the automatic brake control, without linking the starting of the matching determination with the starting of the automatic brake control.

In the first embodiment, an example was presented in which the driving assist control method and control device of the present invention are applied to an electrically driven vehicle equipped with an automatic brake control system and an electrically controlled brake unit 4. However, the driving assist control method and control device of the present invention can be applied to a vehicle equipped with another driving assist control system that avoids contact between the host vehicle and a pedestrian using a drive source control, a steering control, a brake control other than an automatic brake control system, and the like. Furthermore, in addition to an electrically driven vehicle, the driving assist control method and control device can also be applied to an engine-equipped vehicle; in this case, for example, an electric pump motor of an ABS/VDC actuator is used as the brake actuator. In other words, any driving assist control method and control device for a vehicle that recognize a pedestrian that is present in front of the vehicle and that avoid contact between the host vehicle and the pedestrian during travel can be applied.

The invention claimed is:

1. A vehicle driving assist control method, provided with external environment recognition sensors that obtain forward information of a host vehicle, for executing a driving assist control for avoiding contact between the host vehicle and a pedestrian, when a pedestrian is detected by the external environment recognition sensors, the vehicle driving assist control method comprising:
   providing a camera and a radar as the external environment recognition sensors;
   starting the vehicle driving assist control with a detected pedestrian candidate as a control target, upon detecting an object that is present in front of the host vehicle to be the pedestrian candidate based on an image signal from the camera; and
   determining by comparison thereafter whether or not the pedestrian candidate detected by the camera matches an object detected by the reflected waves from the radar, and continuing the vehicle driving assist control if matching is established and canceling the vehicle driving assist control if matching is not established.

2. The vehicle driving assist control method according to claim 1, wherein
   in the determining by comparison step, setting an allowable error region with position information in accordance with direction or distance of the pedestrian candidate detected by the camera as a center point, and
   when the position information in accordance with the direction or distance of an object that is closest to the pedestrian candidate from among a plurality of objects detected by the reflected waves from the radar matches within the allowable error region for a predetermined time, the pedestrian candidate detected by the camera is determined to be a pedestrian as the control target.

3. The vehicle driving assist control method according to claim 1, wherein
   the vehicle driving assist control executes an alarm and automatic brake control when execution of the vehicle driving assist control is permitted, and
   starts an alarm that occurs in a first stage upon determining a possibility of contact with a pedestrian,
   starts preliminary braking with slow braking in addition to the alarm that occurs in a second stage in which the possibility of contact with a pedestrian is determined to be greater than in the first stage, and
   starts main braking with sudden braking in addition to the alarm that occurs in a third stage in which the possibility of contact with a pedestrian is determined to be greater than in the second stage.

4. The vehicle driving assist control method according to claim 3, wherein
   the alarm and automatic brake control is configured such that, when shifting from determination of the pedestrian candidate using the camera to determination of a pedestrian using a comparison determination that includes the radar, a permitted deceleration G of the alarm and automatic brake control is set to be greater than the permitted deceleration G while the pedestrian candidate is being detected.

5. A vehicle driving assist control device comprising:
   external environment recognition sensors that acquire forward information of a host vehicle; and
   a driving assist controller that executes a vehicle driving assist control for avoiding contact between the host vehicle and a pedestrian, when the pedestrian is determined by the external environment recognition sensors;
   the external environment recognition sensors including a camera and a radar,
   the driving assist controller being configured to permit execution of the vehicle driving assist control, with a determined pedestrian candidate as a control target, when an object that is present in front of the host vehicle is determined to be the pedestrian candidate based on an image signal from the camera, and
   a control process being carried out thereafter to determine using comparison whether or not the pedestrian candidate detected by the camera matches an object detected by the reflected waves from the radar, and the driving assist control is continued if matching is established and the driving assist control is canceled if matching is not established.

* * * * *